United States Patent Office 2,917,504
Patented Dec. 15, 1959

2,917,504

TETRAKISAZO DYESTUFFS

Klaus Böckmann, Koln-Stammheim, Germany, assignor to Farbenfabriken Bayer Aktiengesellschaft, Leverkusen, Germany, a corporation of Germany No Drawing. Application August 4, 1955
Serial No. 526,553

Claims priority, application Germany August 25, 1954

6 Claims. (Cl. 260—167)

The present invention relates to tetrakisazo dyestuffs and to a process of making the same; more particularly, it relates to dyestuffs corresponding to the general formula:

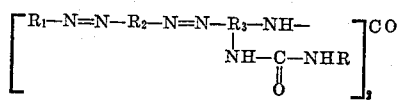

In this formula, R stands for hydrogen, lower alkyl, hydroxy lower alkyl or aryl and $R_1$ and $R_2$ mean a radical of the benzene or naphthalene series, at least one of the radicals $R_1$ and $R_2$ bearing at least one sulfonic acid group, and $R_3$ stands for a radical of the benzene series carrying the

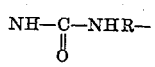

group in o-position to the azo bridge and the —NH-group in p-position to the azo bridge.

The new tetrakisazo dyestuffs can be obtained by coupling diazotized amino monoazo dyestuffs of the benzene or naphthalene series with a 3-amino-1-phenyl urea of the general formula:

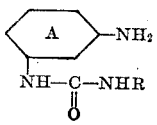

wherein R has the same meaning as above and the benzene nucleus A may be further substituted except for the coupling position and converting the aminodisazo dyestuffs thus obtained—e.g. by treating them with phosgene—into their ureas.

The 3-amino-phenyl ureas used as coupling components can be obtained by reacting 1-amino-3-acylamino-benzenes with chloro-formic acid phenyl ester in aqueous acetic solution, treating the urethane thus obtained with ammonia or an amine in neutral to alkaline medium. The 3-acylamino-1-phenyl urea, which is formed while phenol is split off, is hydrolised in acid solution to form 3-amino-1-phenyl urea.

The new tetrakisazo dyestuffs dye cotton and regenerated cellulose essentially orange-red to reddish brown shades of very good fastness to light and improved dischargeability.

The following examples illustrate the invention without, however, limiting it thereto; the parts being by weight:

Example 1

357 parts of 4-amino-azo-benzene-3,4'-disulfonic acid are diazotized in usual manner and coupled with 151 parts of 3-amino-phenyl urea in acetic acid solution. The resulting amino-disazo dyestuff is converted into the corresponding urea by reacting it with phosgene. When the amino disazo dyestuff has completely reacted, the resulting tetrakisazo dyestuff of the formula:

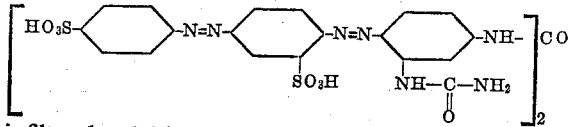

is filtered and dried. It represents a brown powder which is readily soluble in water. The new dyestuff dyes cotton and regenerated cellulose in orange-red shades of very good fastness to light and very good dischargeability.

Example 2

357 parts of 4-amino-azo-benzene-3,4'-sulfonic acid are diazotized as described in Example 1 and then combined with 195 parts of N-(3-amino)-1-phenyl-N'-hydroxyethyl urea. The formed amino disazo dyestuff is converted into its urea with phosgene. After drying the resulting azo dyestuff corresponding to the formula:

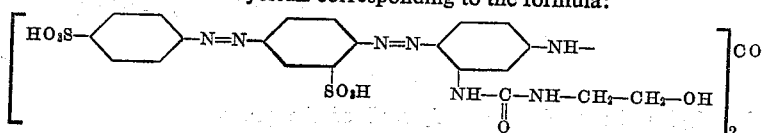

is a brownish red powder which is readily soluble in water; it dyes cotton and regenerated cellulose in scarlet red shades of very good fastness to light and good dischargeability.

Example 3

The amino azo dyestuff which can be obtained by coupling 253 parts of diazotized 1-aminobenzene-2,4-disulfonic acid and 121 parts of 1-amino-2,5-dimethylbenzene is diazotized in usual manner and combined with 151 parts of 3-amino-phenyl-urea in acetic acid solution. The formed amino disazo dyestuff is converted into the urea with phospgene. The dyestuff thus obtained corresponds to the formula:

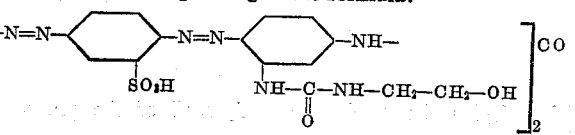

After drying it represents a brown powder which is readily soluble in water; it dyes cotton and regenerated cellulose in red-brown shades of good fastness to light and good dischargeability.

Example 4

357 parts of 4-amino-azo-benzene-3,4'-disulfonic acid are diazotized as described in Example 1, coupled with 308 parts of N-(3-amino)-1-phenyl-N'-3-sulfophenyl urea and the formed amino disazo dyestuff is converted into the urea with phosgene. After drying the resulting azo dyestuff of the formula:

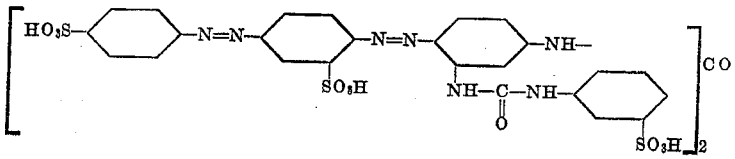

represents a brown powder which is soluble in water; it dyes cotton and regenerated cellulose in orange-red shades of good fastness to light and good dischargeability.

Example 5

The monoazo dyestuff obtained by coupling 303 parts of diazotized 2-amino-naphthalene-6,8-disulfonic acid with 107 parts of 1-amino-3-methylbenzene is diazotized in usual manner and coupled with 151 parts of 3-aminophenyl urea in acetic acid solution. After converting the amino dyestuff into the urea with phosgene the tetrakisazo dyestuff of the formula:

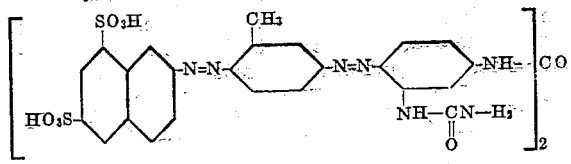

is isolated and dried. It represents a brown powder which is readily soluble in water; it dyes cotton and regenerated cellulose in brown shades of good fastness to light and good dischargeability.

Example 6

The amino azo dyestuffs, obtained by coupling 253 parts of diazotized 1-aminobenzene-2,5-disulfonic acid with 121 parts of 1-amino-2,5-dimethylbenzene, is diazotized in acetic acid solution and combined with 165 parts of 3-amino-4-methyl-1-phenyl urea. The formed amino disazo dyestuff is converted into the urea with phosgene.

After drying the resulting azo dyestuff of the general formula:

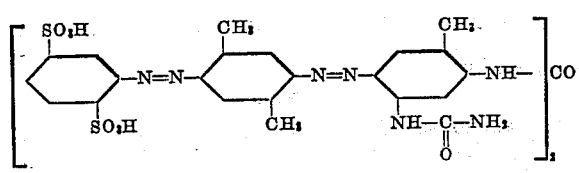

represents a brown powder which is soluble in water; it dyes cotton and regenerated cellulose in reddish-brown shades of good fastness to light and good dischargeability.

We claim:

1. Tetrakisazo dyestuffs corresponding to the formula

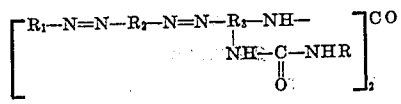

wherein R stands for a member selected from the group consisting of hydrogen, lower alkyl, hydroxy lower alkyl and a sulfophenyl $R_1$ is a membed selected from the group consisting of benzene and naphthalene hydrocarbon radicals, $R_2$ is a benzene hydrocarbon radical, $R_1$ and $R_2$ being substituted by a total of at least one and not more than two sulfonic acid groups, and $R_3$ is a radical selected from the group consisting of phenyl and lower alkyl-substituted phenyl, carrying the urea group in o-position to the azo bridge and the —NH-group in p-position to the azo bridge.

2. A dyestuff according to claim 1 wherein the sulfonic acid groups are attached to the $R_1$ nucleus.

3. The tetrakisazo dyestuff corresponding to the following formula:

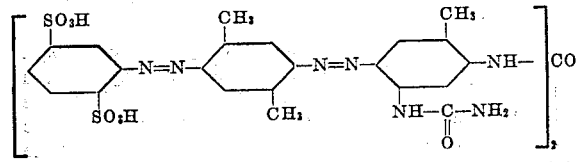

4. The tetrakisazo dyestuff corresponding to the following formula:

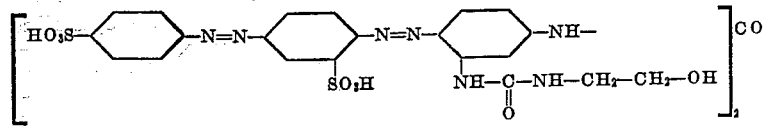

5. The tetrakisazo dyestuff corresponding to the following formula:

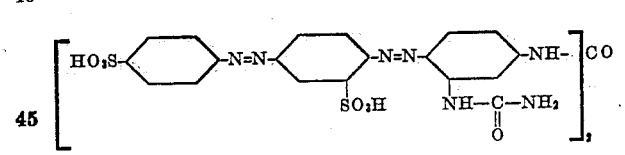

6. The tetrakisazo dyestuff corresponding to the following formula:

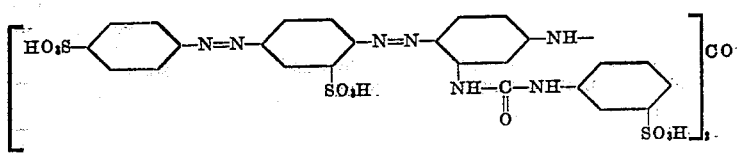

References Cited in the file of this patent

UNITED STATES PATENTS

| | | |
|---|---|---|
| 1,863,792 | Hentrich et al. | June 21, 1932 |
| 2,249,334 | Sparks et al. | July 15, 1941 |
| 2,286,795 | Dickey et al. | June 16, 1942 |
| 2,606,897 | Grandjean | Aug. 12, 1952 |
| 2,708,668 | Suckfull | May 17, 1955 |